United States Patent
Moore et al.

(10) Patent No.: US 6,836,821 B2
(45) Date of Patent: Dec. 28, 2004

(54) SYSTEM AND METHOD FOR PROVIDING GRAPH STRUCTURING FOR LAYERED VIRTUAL VOLUMES

(75) Inventors: Joseph G. Moore, Wichita, KS (US); William P. Delaney, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 399 days.

(21) Appl. No.: 10/127,870

(22) Filed: Apr. 23, 2002

(65) Prior Publication Data

US 2003/0200390 A1 Oct. 23, 2003

(51) Int. Cl.[7] .............................................. G06F 12/00
(52) U.S. Cl. ........................................................ 711/114
(58) Field of Search ................................. 711/112, 114, 711/148, 154; 707/100, 200; 345/536; 706/59; 717/149

(56) References Cited

U.S. PATENT DOCUMENTS 6,154,736 A * 11/2000 Chickering et al. ........... 706/59
6,219,833 B1 * 4/2001 Solomon et al. ............. 717/149
6,711,591 B1 * 3/2004 Rafanello et al. ............ 707/200

OTHER PUBLICATIONS

"Scout: A Path-Based Operating System" by David Mosberger; a Dissertation for the University of Arizona; copyright 1997.

* cited by examiner

Primary Examiner—Pierre M. Vital
(74) Attorney, Agent, or Firm—Suiter West PC LLO

(57) ABSTRACT

The present invention is directed to a system and method for generalize graph structuring for layered virtual volumes. In embodiments of the present invention, such a system and method are suitable for enabling implementation of storage area networking (SAN) features on RAID storage devices. In an aspect of the present invention, a method of providing access to volumes in an electronic storage device suitable for storing electronic data may include structuring a plurality of volumes accessible on an electronic storage device, the volumes being a unit of logical storage, wherein the plurality of volumes are structured as a graph structure. Interaction with the volumes is performed through the use of the graph structure.

20 Claims, 4 Drawing Sheets

SYSTEM AND METHOD FOR PROVIDING GRAPH STRUCTURING FOR LAYERED VIRTUAL VOLUMES

FIELD OF THE INVENTION

The present invention generally relates to the field of electronic data storage, and particularly to a system and method for providing generalized graph structuring for layered virtual volumes, such a system and method being suitable for enabling implementation of storage area networking (SAN) features on RAID storage devices.

BACKGROUND OF THE INVENTION

The reliable and persistent storage of electronic data is one of the most important aspects of modern business and personal life. Consumers, businesses and governmental entities are increasingly relying on electronic data storage for storing the most sensitive and necessary information. Because of this increased reliance, data storage techniques must address the increasingly larger amounts of electronic data stored in a manner to provide persistent and reliable data storage.

One such method utilized to provide persistent data storage is through the use of a redundant array of independent disks (RAID). In this method, multiple disks are utilized to store data, and such storage may be done utilizing a variety of storage methods in a redundant manner as desired, such as RAID 1, RAID 4, RAID 5 and the like. However, the use of RAID in large groupings may prove difficult to administer, because multiple arrays may be needed to provide the storage desired.

Another method involves the use of a storage area network (SAN) for connected shared data storage resources. Storage area networks are typically implemented as high speed networks similar to a local area network (LAN) to provide direct connection between storage devices and clients. Although storage area networks may involve decreased technical support, due to interoperability of devices and the resultant ability to administer the devices, the implementation of a SAN is generally expensive, with high structural costs.

Therefore, it would be desirable to provide storage device functionality that is efficient to administer, is cost effective and may be sized for the desired application.

SUMMARY OF THE INVENTION

Accordingly, the present invention is directed to a system and method for generalized graph structuring for layered virtual volumes. In embodiments of the present invention, such a system and method is suitable for enabling implementation of storage area networking (SAN) features on RAID storage devices. In an aspect of the present invention, an electronic storage device includes electronic storage media including a plurality of virtual volumes implemented by a storage controller, the volumes being a unit of logical storage, wherein the plurality of volumes are structured by the storage controller based on a graph structure.

In an additional aspect of the present invention, a method of providing access to volumes in an electronic storage device suitable for storing electronic data includes structuring a plurality of virtual volumes accessible on an electronic storage device, the virtual volumes being a unit of logical storage, wherein the plurality of virtual volumes are structured in a graph structure. Interaction with the virtual volumes is performed through the use of the graph structure.

In a further aspect of the present invention, a redundant array of independent disks includes at least one electronic storage medium and a controller. The electronic storage medium is suitable for storing data. The controller is suitable for controlling data storage operations of the electronic storage medium and provides virtual volumes for manipulation of data. The controller provides interaction with the plurality of virtual volumes based on a graph structure, the graph structure including edges representing child relationships between volumes and edges representing listener relationships between volumes, wherein volumes are viewable as nodes of a graph structure It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1A through 3, exemplary embodiments of the present invention are shown. The invention serves as an implementation technique for the development of Storage Area Networking (SAN) features on RAID storage devices. The invention provides capabilities that are useful in the implementation of features that are characterized as enabling the concept of "storage virtualization" via the creation of "virtual" volumes. These volumes are structured in a way that effectively creates a layer of virtual storage that is built upon the base storage characteristics provided by the underlying RAID volumes. The invention may be implemented as an Extensible Volume Framework (EVF) component in firmware.

In aspects of the present invention, the invention contributes to implementation of SAN features, such as snapshot copy, remote mirroring and the like. Due to the volume abstractions provided by the EVF of the present invention, the implementation of the invention may be realized without any direct coupling to the implementation of SAN features. Instead, the EVF provides core services that are utilized to create and integrate virtual volumes. The implementations of the specific features are built using these core services.

Figure 1A:
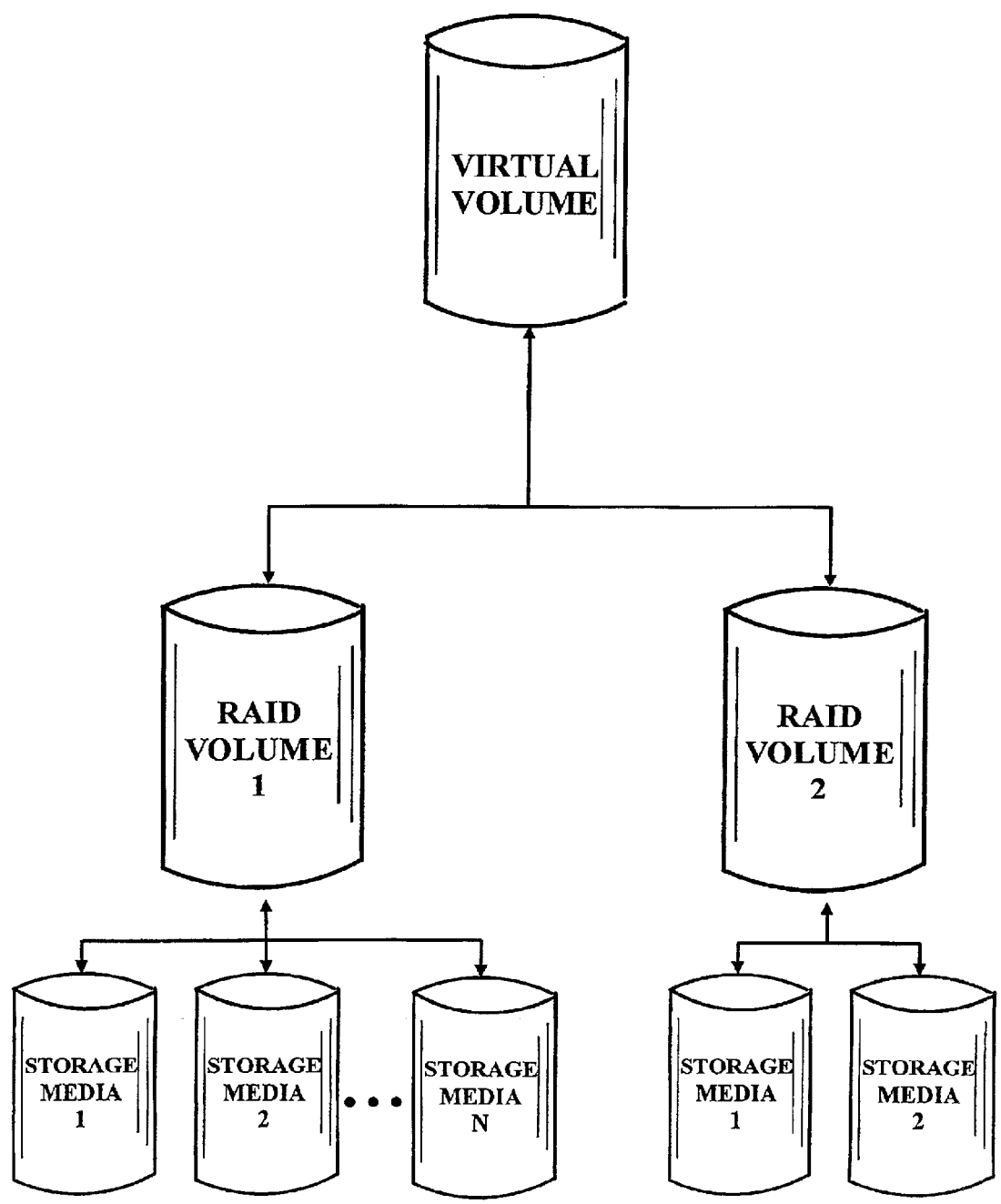
FIG. 1A is an illustration of an embodiment of the present invention wherein a layered view of storage system organization is shown.

In a RAID system, data is stored on the media. However, the media contains only sequences of data blocks. To organize and interact with the data, RAID volumes may be implemented within the software of a controller. SAN features may be implemented in the present invention as "virtual" volume abstractions, at a layer above a RAID implementation, as shown in FIG. 1A. Thus, SAN features, through use of the present invention, may be employed as virtual volume abstractions that are layered above the abstraction of a disk paradigm provided by RAID.

Thus, instead of implementing such services directly, the EVF provides a volume structuring mechanism based on a generalized mathematical structure of a graph. Implementors of the specific features may create higher-level volume abstractions in order to accomplish the required behavior for the feature. These higher-level volume abstractions are then contained in a graph structure, such as a runtime volume hierarchy, within the EVF. In this way, by structuring virtual volumes as a graph, techniques may be utilized to achieve SAN functionality.

In an embodiment of the present invention, the specifics of the invention concern the application of graph algorithms to accomplish specific goals that are required for the implementation of SAN features. By structuring the volume abstractions in a generalized graph structure, then, in addition to achieving the effect of a layered structure, the EVF allows the application of graph algorithms to accomplish the required goals.

Graphs may be defined as a set of vertices and edges which connect the vertices, which may be denoted as the following:

$$G=\{V,E\}$$

where V is the set of vertices and E is the set of edges, $$E=\{(Vi,Vj)\}$$

where Vi and Vj are in V.

There are a variety of different types of graphs, such as directed graphs, undirected graphs, weighted graphs, and the like. Directed graphs include edges with an associated direction. In undirected graphs, the edges are non-directional. In weighted graphs, edges have an associated weight. Graphs may be represented as a collection of adjacency lists, as an adjacency matrix, and the like.

The EVF applies graph algorithms to the runtime volume hierarchy to accomplish many of its computational goals:

To achieve temporary suspension (i.e., temporary queuing) of I/O requests for a sub-graph of the hierarchy.

To achieve a quiescent state (i.e., return a status of quiescence to the I/O requester) for a sub-graph of the hierarchy.

To determine what standard RAID volumes (a subset of the leaf nodes in the EVE hierarchy) are related to each other (i.e., the sets of RAID volumes that represent a subset of the partition formed by determining the existence of paths through the graph for these volumes). This determination may be used to change the controller ownership of related sets of RAID volumes atomically.

To determine which higher-level volumes are related to a set of standard RAID volumes, when the set of standard RAID volumes is imported into a storage array.

To determine if the set of higher-level volumes that depend on a given volume are ready to commence I/O processing.

In an aspect of the present invention, a single, parameterized graph traversal function is used to support several of the above-mentioned actions.

Figure 1B:
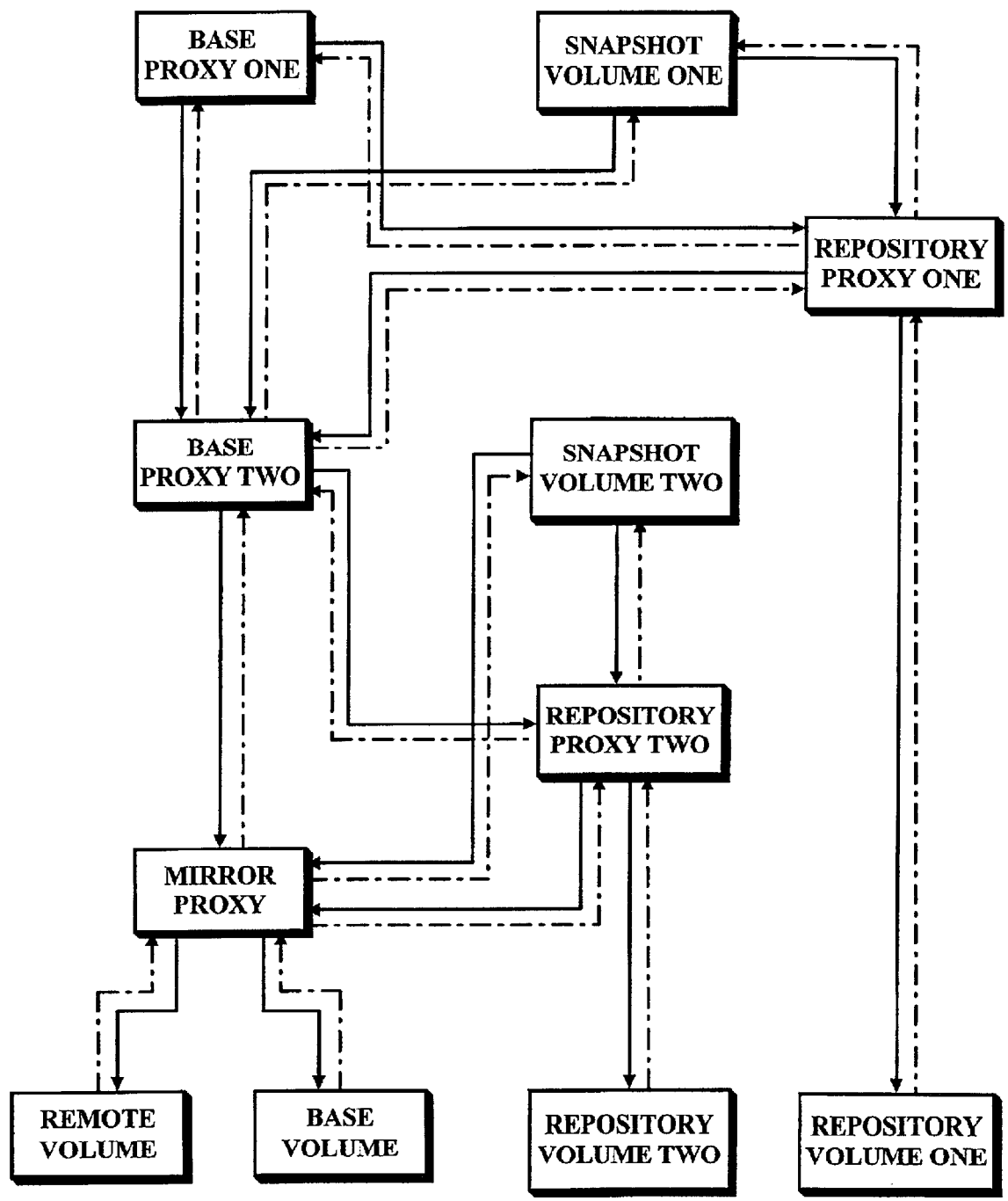
FIG. 1B is a highly diagrammatic block diagram of an embodiment of the present invention wherein an exemplary runtime volume graph is shown.

Referring now to FIG. 1B, an embodiment of the present invention including a hypothetical example of a runtime volume graph is shown. In the figure, two types of edges are shown: solid, "downward" edges are used to represent child relationships, and the dashed "upward" edges are used to represent listener relationships.

In an implementation of an embodiment, the child relationships are stored within the C++ classes representing the volumes themselves, whereas the listener relationships are stored within a configuration class that manages the entire hierarchy.

For the purposes of the invention, i.e., the application of graph algorithms to this structuring, these sets of edges may be used to obtain differing "views" of the graph structure. "Viewing" may include the ability of a processor or user to determine relationships between logical data elements. The child relationships may be viewed as a directed graph in the "downward" direction. In a similar manner, the listener relationships may be viewed as a directed graph in the "upward" direction as shown in FIG. 1B.

Figure 2:
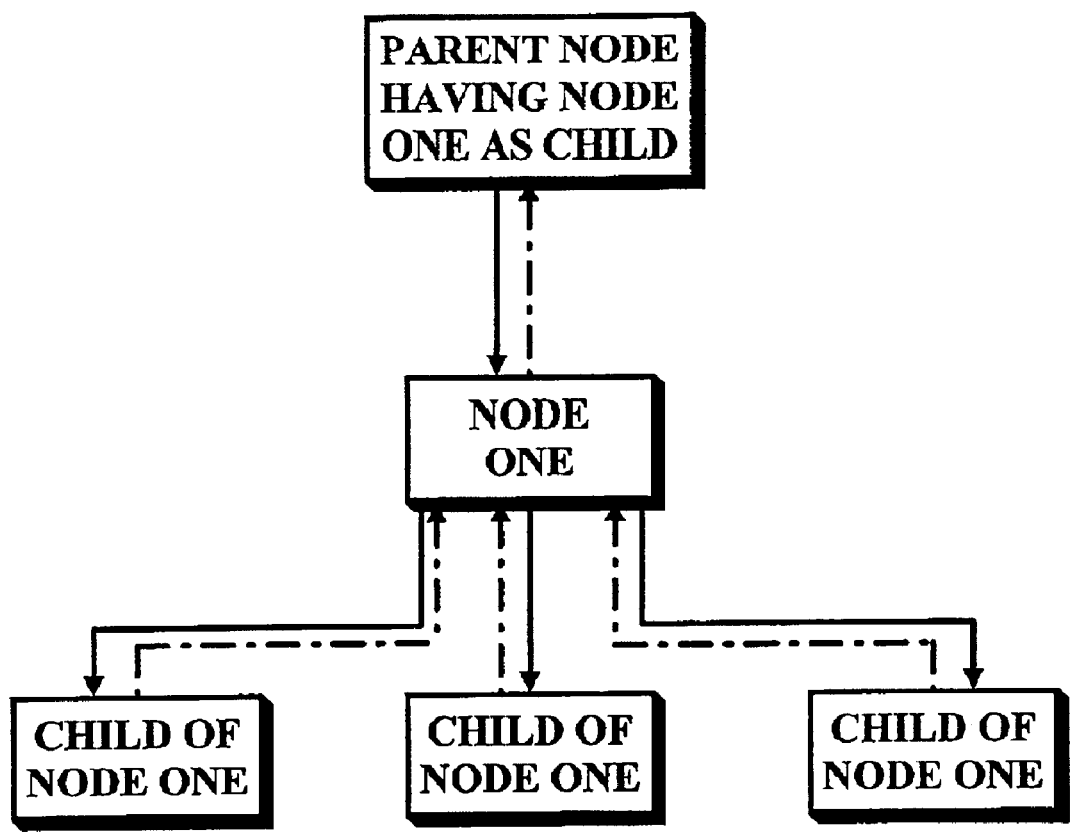
FIG. 2 is a block diagram of an embodiment of the present invention in which use of an undirected view utilized to determine adjacent volumes is shown.
Figure 3:
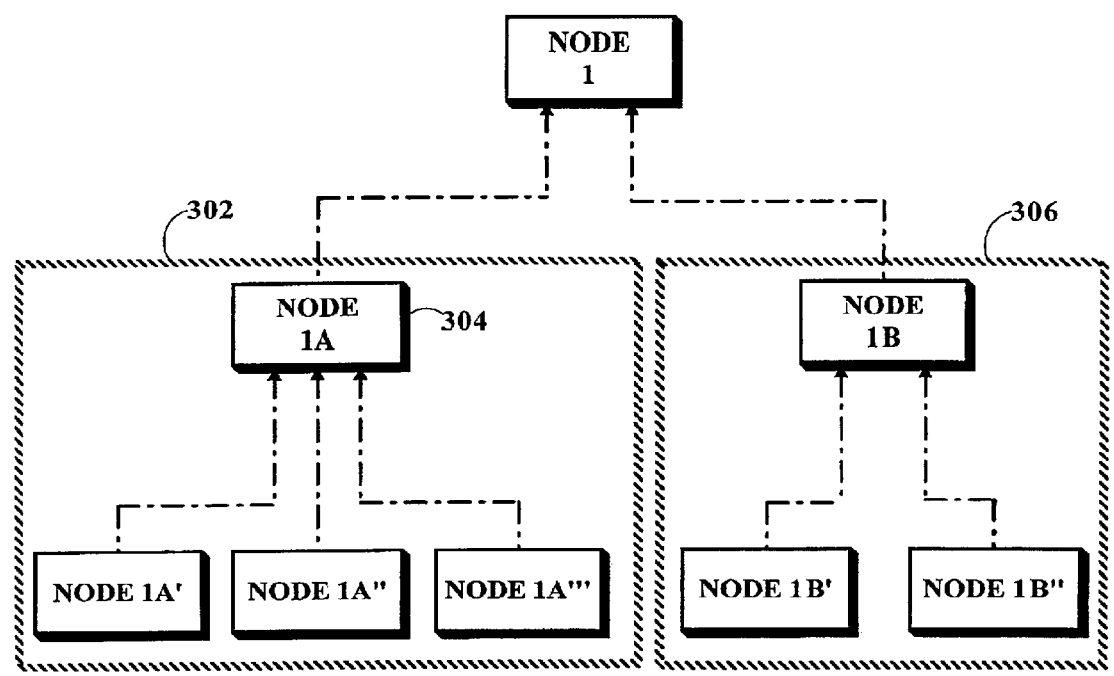
FIG. 3 is a block diagram of an embodiment of the present invention wherein sub-graph suspension may be obtained based on viewing a directed graph indicating volume structure.

In addition, both sets of edges can be used to create a view of the structuring that is an undirected graph of the entire set of volumes. To achieve this view, at any given node, the adjacent nodes are viewed to be the union of the child set and the subset of the listener set that has this node as a child, an example of which is shown in FIG. 2. The runtime volume graph's invariant property that a volume listens to all of its children ensures that this view (i.e., an undirected-graph view) is valid.

To achieve sub-graph suspension or quiescence, the upward directed graph is traversed in a depth-first order, starting from the point in the graph that represents the point in the graph requiring the quiescence (e.g., the volume that is the target of the configuration change). The use of a graph-algorithmic approach enables the identification of the affected sub-graph. Further, the ordering provided by the depth-first search algorithm allows the attainment of quiescence for the affected sub-graph to be optimal but still safe. For example, as shown in the example depicted in FIG. 3, a first sub-graph 302 may be suspended for a configuration change to a node 304 without affecting a second sub-graph 306.

By achieving suspension at the farthest reaches of the graph, such as in the case of FIG. 1, wherein the deepest nodes are at the top of the graph, suspension is implemented for the minimal number of volumes, thus attaining optimality. The ordering assures safety by ensuring that once the exterior (i.e., the deepest) nodes are suspended for a given sub-graph, the interior nodes are no longer reachable by I/O requests as the traversal continues.

The "upward" view is also used to determine if a volume has a parent volume of a particular type in the graph. This may be used to limit configurations, such as by not allowing a mirror to be created for a volume that has an existing snapshot.

The upward directed-graph view may also be used to determine when a sub-graph is ready to begin I/O processing. In this approach, the reachable volumes are traversed, and each volume is allowed to "vote" as to whether it is ready to commence I/Os. Once a consensus is reached, I/Os are allowed to enter the sub-graph. These two tasks are achieved by a breadth-first traversal. In a contemplated version of the EVF, a single, parameterized implementation of the breadth-first traversal algorithm is used to accomplish these tasks.

The undirected graph view may be used to determine the set standard volumes that are related to a given volume. This algorithm is used primarily to determine the set of related standard volumes that should have their ownership transferred between controllers in an atomic manner. The graph is searched starting at the node that is the target of the algorithm, and each reachable standard volume is added to the result set.

The downward directed-graph view may be used to determine a set of higher-level volumes to import along with a given set of standard volumes. For instance, the graph is explored in a depth first order to determine reachability to any member of the imported base-volume set.

The invention is presented as being an extension of a more standard approach to structuring based on layering. Layered software architectures are discussed in following reference, which is hereby incorporated by reference in its entirety; *Pattern-Oriented Software Architecture: A System of Patterns*, Frank Buschmann, Regine Meunier, Hans Rohnert, Peter Sommerlad, Michael Stal, John Wiley and Sons Ltd., 1996. The runtime, I/O processing view of the volume structuring constitutes an implementation of an enhanced SCSI protocol stack. Layering to achieve protocol implementations are discussed in, e.g., *Computer Networks*, $3^{rd}$ Ed, Andres Tanenbaum, Prentice Hall, 1996 and *Design and Validation of Computer Protocols*, Gerald J. Holzmann, Prentice Hall, 1991, which are also herein incorporated by reference in its entirety.

Structuring a protocol implementation as a graph is proposed in Mosberger. *Scout: A Path-based Operating System*, PhD Dissertation, Department of Computer Science, University of Arizona, which is also herein incorporated by reference in its entirety. Graph algorithms are discussed in a variety of data-structure/algorithm textbooks; see, e.g., *Introduction to Algorithms*, Thomas H. Cormen, Charles E. Leiserson and Ronald L. Rivest, McGraw Hill, 1990, which is also incorporated by reference.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more storage device systems, which may include memory for storing a program of instructions and a controller for performing the program of instruction, wherein the program of instructions configures the processor and storage device system. Until required by the storage device system, the set of instructions may be stored in another readable memory device, for example in firmware, in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an storage device system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An electronic storage device, comprising:
   electronic storage media including a plurality of virtual volumes implemented by a storage controller, the volumes being a unit of logical storage, wherein the plurality of virtual volumes are structured by the storage controller based on a graph structure, the graph structure includes edges representing child relationships between volumes and edges representing listener relationships between volumes, the child relationship edges and the listener relationship edges taken together are viewable as an undirected graph, the volumes are viewable as modes of a graph structure, wherein adjacent nodes of a node are viewed as a union of a child set and a subset of a listener set that has the node as a child.

2. The electronic storage device as described in claim 1, wherein the child relationship edges are viewable as a directed graph and the listener relationship edges are viewable as a directed graph.

3. The electronic storage device as described in claim 1, wherein the graph structure includes edges representing listener relationships between volumes, a view of the graph structure is suitable of determining if a volume has a parent volume of a particular type in the graph structure.

4. The electronic storage devices as described in claim 1, wherein the child relationship edges and the listener relationship edges taken together are viewable as an undirected graph, the view of the undirected graph suitable for determining a set of RAID volumes related to a given volume.

5. An electronic storage device, comprising:
   electronic storage media including a plurality of virtual volumes implemented by a storage controller, the volumes being a unit of logical storage, wherein the plurality of virtual volumes are structured by the storage controller based on a graph structure, the volumes are viewable as nodes of a graph structure, quiescence of a sub-graph of a node of the graph structure is achieved by traversing listener relationships in a depth-first order starting from a point in the graph structure representing a volume that is a target of a configuration change.

6. An electronic storage device, comprising:
electronic storage media including a plurality of virtual volumes implemented by a storage controller, the volumes being a unit of logical storage, wherein the plurality of virtual volumes are structured by the storage controller based on a graph structure, the graph structure includes edges representing listener relationships between volumes, a view of this graph structure is suitable for determining whether a sub-graph is ready to begin I/O processing, determining whether a sub-graph is ready to begin I/O processing includes traversing reachable volumes, each of the reached volumes indicating whether the volume is ready to begin I/O processing, upon reaching a consensus of an indicated ready status, allowing I/Os to enter the sub-graph structure.

7. An electronic storage device, comprising:
electronic storage media including a plurality of virtual volumes implemented by a storage controller, the volumes being a unit of logical storage, wherein the plurality of virtual volumes are structured by the storage controller based on a graph structure, the graph structure includes edges representing child relationships between volumes which are viewable as a directed graph, the directed graph suitable for determining a set of higher-level volumes to import along with a given set of standard volumes, the graph structure being explored in a depth first order to determine reachability to members of an imported base-volume set.

8. A method of providing access to volumes in an electronic storage device suitable for storing electronic data, comprising:
structuring a plurality of virtual volumes accessible on an electronic storage device, the virtual volumes being a unit of logical storage, wherein the plurality of volumes are structured as a graph structure; and
interacting with the volumes through use of the graph structure, wherein the graph structure includes edges representing child relationships between volumes and edges representing listener relationships between volumes, the child relationship edges and the listener relationship edges taken together are viewable as an undirected graph, the volumes are viewable as nodes of a graph structure, wherein adjacent nodes of a node are viewed as a union of a child set and a subset of a listener set that has the node as a child.

9. The method as described in claim 8, wherein the child relationship edges are viewable as a directed graph and the listener relationship edges are viewable as a directed graph.

10. The method as described in claim 8, wherein the graph structure includes edges representing listener relationships between volumes, a view of the graph structure is suitable of determining if a volume has a parent volume of a particular type in the graph structure.

11. The method as described in claim 8, wherein the child relationship edges and the listener relationship edges taken together are viewable as an undirected graph, the view of the indirected graph suitable for determining a set of RAID volumes related to a given volume.

12. A method of providing access to volumes in an electronic storage device suitable for storing electronic data, comprising:
structuring a plurality of virtual volumes accessible on an electronic storage device, the virtual volume being a unit of logical storage, wherein the plurality of volumes are structured as a graph structure; and
interacting with the volumes through use of the graph structure, wherein volumes are viewable as nodes of a graph structure, quiescence of a sub-graph of a node of the graph structure is achieved by traversing listener relationships in a depth-first order starting from a point in the graph structure representing a volume that is a target of a configuration change.

13. A method of providing access to volumes in an electronic storage device suitable for storing electronic data, comprising:
structuring a plurality of virtual volumes accessible on an electronic storage device, the virtual volumes being a unit of logical storage, wherein the plurality of volumes are structured as a graph structure; and
interacting with the volumes through use of the graph structure, wherein the graph structure includes edges representing listener relationships between volumes, a view of this graph structure is suitable for determining whether a sub-graph is ready to begin I/O processing, determining whether a sub-graph is ready to begin I/O processing includes traversing reachable volumes, each of the reached volumes indicating whether the volume is ready to begin I/O processing, upon reaching a consensus of an indicated ready status, allowing I/Os to enter the sub-graph structure.

14. A method of providing access to volumes in an electronic storage device suitable for storing electronic data, comprising:
structuring a plurality of virtual volumes accessible on an electronic storage device, the virtual volumes being a unit of logical storage, wherein the plurality of volumes are structured as a graph structure; and
interacting with the volumes through use of the graph structure, wherein the graph structure includes edges representing child relationships between volumes which are viewable as a directed graph, the directed graph suitable for determining a set of higher-level volumes to import along with a given set of standard volumes, the graph structure being explored in a depth first order to determine reachability to members of an imported base-volume set.

15. A redundant array of independent disks, comprising:
at least one electronic storage medium suitable for storing data; and
a controller suitable for controlling data storage operations of the electronic storage medium, the controller providing virtual volumes for manipulation of data;
wherein the controller provides interaction with the plurality of virtual volumes based on a graph structure, the graph structure including edges representing child relationships between volumes, edges representing listener relationships between volumes and wherein volumes are viewable as nodes of a graph structure, the child relationship edges and the listener relationship edges taken together are viewable as an undirected graph, adjacent nodes of a node are viewed as a union of a child set and a subset of a listener set that has the node as a child.

16. The redundant array of independent disks as described in claim 15, wherein the child relationship edges are viewable as a directed graph and the listener edges are viewable as a directed graph.

17. The redundant array of independent disks as described in claim 15, wherein the child relationship edges and the listener relationship edges taken together are viewable as an undirected graph, the view of the undirected graph suitable for determining a set of RAID volumes related to a given volume.

18. A redundant array of independent disks, comprising:

at least one electronic storage medium suitable for storing data; and a controller suitable for controlling data storage operations of the electronic storage medium, the controller providing virtual volumes for manipulation of data;

wherein the controller provides interaction with the plurality of virtual volumes based on a graph structure, the graph structure including edges representing child relationships between volumes, edges representing listener relationships between volumes and wherein volumes are viewable as nodes of a graph structure, the volumes are viewable as nodes of a graph structure, quiescence of a sub-graph of a node of the graph structure is achieved by traversing listener relationships in a depth-first order starting from a point in the graph structure representing a volume that is a target of a configuration change.

19. A redundant array of independent disks, comprising:

at least one electronic storage medium suitable for storing data; and a controller suitable for controlling data storage operations of the electronic storage medium, the controller providing virtual volumes for manipulation of data;

wherein the controller provides interaction with the plurality of virtual volumes based on a graph structure, the graph structure including edges representing child relationships between volumes, edges representing listener relationships between volumes and wherein volumes are viewable as modes of a graph structure, the graph structure including listener relationships is suitable for determining at least one of if a volume has a parent volume of a particular type in the graph structure and whether a sub-graph is ready to begin I/O processing, determining whether a sub-graph is ready to begin I/O processing includes traversing reachable volumes, each of the reached volumes indicating whether the volume is ready to begin I/O processing, upon reaching a consensus of an indicated ready status, allowing I/Os to enter the sub-graph structure.

20. A redundant array of independent disks, comprising:

at least one electronic storage medium suitable for storing data; and a controller suitable for controlling data storage operations of the electronic storage medium, the controller providing virtual volumes for manipulation of data;

wherein the controller provides interaction with the plurality of virtual volumes based on a graph structure, the graph structure including edges representing child relationships between volumes, edges representing listener relationships between volumes and wherein volumes are viewable as nodes of a graph structure, the graph structure includes edges representing child relationships between volumes which are viewable as a directed graph, the directed graph suitable for determining a set of higher-level volumes to import along with a given set of standard volumes, the graph structure being explored in a depth first order to determine reachability to members of an imported base-volume set.

* * * * *